(12) United States Patent
Kwatra et al.

(10) Patent No.: US 10,916,245 B2
(45) Date of Patent: Feb. 9, 2021

(54) INTELLIGENT HEARING AID (71) Applicant: INTERNATIONAL BUSINESS MACHINES CORPORATION, Armonk, NY (US)

(72) Inventors: Shikhar Kwatra, Durham, NC (US); Komminist Weldemariam, Ottawa (CA); Sarbajit K. Rakshit, Kolkata (IN); Paul Krystek, Highland, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 240 days.

(21) Appl. No.: 16/107,024

(22) Filed: Aug. 21, 2018

(65) Prior Publication Data
US 2020/0066264 A1 Feb. 27, 2020

(51) Int. Cl.
G10L 15/22 (2006.01)
G10L 15/18 (2013.01)
G10L 25/63 (2013.01)
G06N 20/00 (2019.01)
G10L 15/08 (2006.01)

(52) U.S. Cl.
CPC ............ G10L 15/22 (2013.01); G06N 20/00 (2019.01); G10L 15/1815 (2013.01); G10L 25/63 (2013.01); G10L 2015/088 (2013.01); G10L 2015/223 (2013.01)

(58) Field of Classification Search
CPC ................ G10L 15/22; G10L 15/1815; G10L 2015/088; G10L 25/63; G10L 15/063; G10L 2015/225; G06N 99/005; H04R 25/505; H04R 25/407; H04R 25/70; H04R 2225/43; H04R 2225/41; H04R 25/30
See application file for complete search history.

(56) References Cited

U.S. PATENT DOCUMENTS

| 9,420,383 | B1 | 8/2016 | Lee et al. | |
|---|---|---|---|---|
| 9,426,582 | B2 | 8/2016 | Pontoppidan | |
| 9,609,442 | B2 | 3/2017 | Krystek et al. | |
| 2006/0222194 | A1* | 10/2006 | Bramslow | H04R 25/305 381/314 |
| 2011/0123056 | A1* | 5/2011 | Aboulnasr | H04R 25/70 381/314 |
| 2015/0271608 | A1* | 9/2015 | Sabin | H04R 25/70 381/314 |

(Continued)

OTHER PUBLICATIONS

El Kaliouby, R., & Robinson, P. (2005). The emotional hearing aid: an assistive tool for children with Asperger syndrome. Universal Access in the Information Society, 4(2), 121-134. (Year: 2005).*

(Continued)

Primary Examiner — Edgar X Guerra-Erazo
(74) Attorney, Agent, or Firm — Griffiths & Seaton PLLC (57) ABSTRACT Embodiments for using an intelligent hearing aid device by a processor. Audio data may be received and analyzed for a user according to a plurality of user preferences and interests, historical activity patterns of the user, or a combination thereof. One or more hearing assistive actions may be performed in relation to the audio data to facilitate hearing according to the plurality of user preferences and interests, historical activity patterns of the user, or a combination thereof.

17 Claims, 6 Drawing Sheets (56) References Cited

U.S. PATENT DOCUMENTS

2017/0280257 A1    9/2017   Gordon et al.
2019/0149927 A1*   5/2019   Zhang .................... G06F 3/165
                                                            704/271

OTHER PUBLICATIONS

T. Zhang, F. Mustiere and C. Micheyl, "Intelligent hearing aids: The next revolution," 2016 38th Annual International Conference of the IEEE Engineering in Medicine and Biology Society (EMBC), Orlando, FL, 2016, pp. 72-76, doi: 10.1109/EMBC.2016.7590643. (Year: 2016).*

Stanford University, "Improving Communication for People with Hearing Loss—Conference Proceedings," Mar. 14-15, 2017 (33 pages).

Anonymous, "System and Methods for an Automated Vibration Haptic Alert Initiated by Sound," An IP.com Prior Art Database Technical Disclosure, IP.com No. IPCOM000247712D, Sep. 29, 2016 (5 pages).

Anonymous, "Method and Apparatus for frequency transposition mobile for audio impaired," An IP.com Prior Art Database Technical Disclosure, IP.com No. IPCOM000243547D, Sep. 30, 2015 (12 pages).

Siemens et al., "Individual Classifier for Hearing Aids," An IP.com Prior Art Database Technical Disclosure, IP.com No. IPCOM000207931D, Jun. 16, 2011 (2 pages).

Kok, "Sound processor app for people with hearing problems," An IP.com Prior Art Database Technical Disclosure, IP.com No. IPCOM000219421D, Jun. 28, 2012 (4 pages).

* cited by examiner

INTELLIGENT HEARING AID

BACKGROUND OF THE INVENTION

Field of the Invention

The present invention relates in general to computing systems, and more particularly to, various embodiments for use of an intelligent hearing aid device using a computing processor.

Description of the Related Art

Hearing deficiencies affect a large percentage of the population. Hearing aids have been developed to compensate for hearing loss in individuals. Hearing aids can provide a great benefit to a wide range of persons with hearing deficiencies. Hearing aids come in many forms from behind the ear type to a molded hearing aid placed in the ear canal. As great strides and advances in technology come to fruition, it is desirable to leverage these advances in hearing aid device.

SUMMARY OF THE INVENTION

Various embodiments for a system using an intelligent hearing aid device by a processor are provided. In one embodiment, by way of example only, a method for use of an intelligent hearing aid device by is provided. Audio data may be received and analyzed for a user according to a plurality of user preferences and interests, historical activity patterns of the user, or a combination thereof. One or more hearing assistive actions may be performed in relation to the audio data to facilitate hearing according to the plurality of user preferences and interests, historical activity patterns of the user, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, hearing aids have been developed to compensate for hearing loss in individuals. Advancements in technology in hearing aids predominately focus on device-level innovation for smart "hearing aid" such as, for example, adjusting hearing and frequency. However, a need exists for providing a system that enables a smart hearing device to analyze and understand a variable indicator or "audible indicator" (e.g., "wake sound", "wake conversation," or sound) that activates the smart hearing device by taking into consideration the user context and user state (e.g., a user's cognitive/mental state, emotional state, sleep/awake state, etc.).

Thus, the present invention provides an intelligent hearing aid device having input/output (I/O) capabilities and enabled to connect to a voice-controlled intelligent personal assistant service. An audible indicator (e.g., a simple sound or complex sound) may be analyzed to provide the user an analysis of detected conversations, audible tones, and/or sounds. The audible indicator can trigger feedback from a user to adjust one or more physical properties such as, for example, adjusting lights of the hearing aids, engaging and/or initiating a phone call to a special recipient based on context, and/or adjusting/changing variable tones, volume, pace of the speech or frequency, etc.

In an additional aspect, the mechanisms of the illustrated embodiments, among other aspects, provide for learning, identifying and using activities of daily living (ADLs), context of daily living (CDLs), and a well-being of a user for cognitively using of the intelligent hearing aid device. In one aspect, the well-being of a user may be a subjective well-being (SWB) that may be defined as the degree to which people have positive thoughts and feelings about their lives and are often measured through self-reports of life satisfaction of a hearing aid that may cognitively detect audio data for a user according to a plurality of user preferences and interests, historical activity patterns of the user, or a combination thereof. The well-being of a user may include the alleviation of adverse impacts upon a person's medical condition, emotional stability, mental stability, physical stability, financial stability, physiological problems, as well as to improve performance in many aspects of life such as daily activities, physical, emotional, mental activities, environmental conditions, and other functions, and also to contribute to the regulation of the various physiological systems of the organism (e.g., person) such as, the immune system. One or more actions may be performed in relation to the audio data to facilitate hearing according to the plurality of user preferences and interests, historical activity patterns of the user, or a combination thereof.

The cognitive hearing aid device may detect conversations, audible tones, and/or sounds, which are of interest to the user, based on monitoring of the user's previous history patterns (e.g., historical hearing aid user patterns, behavioral patterns, previous topical conversations of interest), one or more preferences and/or interests, preferred associates/persons for whom to communicate with, user context (e.g., emotional data of the user such as, for example, tried, stressed, happy, sad, etc.), ADLs, CDLs, and/or cognitive state. For example, a cognitive hearing aid device may detect topical conversations of interest (from previous conversations) that a user likes to talk about (e.g., science and technology and/or politics). The conversations of interest may be detected using facial micro-expressions and other sources in order to determine a level of interest of the user pertaining to the certain topic or subject matter. The cognitive hearing aid device may also detect that user A prefers talking to user B for a selected period of time but not with user C due to similarity of thoughts etc.

In one aspect, the variable indicator (e.g., the wake sound) may include, but not limited do: extractions and conversions of communications/speech (e.g., spoken words) by one or more individuals and/or groups of people, group discussions, animal sounds, loud/soft noises, a cough, a fire alarm, a carbon monoxide alarm, a machine making an improper noise (e.g., a noise due to a defect, incident and/or worn part), whistling, a sound of someone falling to the floor, ambient varmints located in the walls of a home, (e.g., mice, bees), metal smashing or bending, baby crying, glass breaking, detecting sound/conversation from human and/or robot entities, and/or an artificial intelligence ("AI") agent.

It should be noted that any sound can be used and the sounds' corresponding cognitive state of the user may be used to define an "audible indicator" for which the system would be trained to take an action (e.g., a hearing assistive action). The audible indictor is a result of a combination of sounds within a temporal period and the user cognitive state. A user can identify the combination of sounds to create the "audible indicator" or the machine learning operation can self-learn (e.g., with prompted user verification) of a new proposed audible indicator learned from history. For example, extremely loud sounds (e.g., alarms or shattering items such as a glass) may have been previously taught to the system to be audible indictors that lead to actionable hearing assistive events. The cognitive hearing aid system can learn loud sounds are typical actionable situations and propose a new sound it hears as a new audible event. In one aspect, user preference settings may be defined and/or learned, and the present invention provides and enables the user to decide if new or proposed audible indicators may be automatically set by the system or prompted to the user for verification before creation.

In one embodiment, the cognitive hearing device service may perform a joint analysis of the conversation or sound, identifying who/what is communicating the sound (and/or identifying the source of sound), determining a cognitive aspect of the conversation/sound (e.g., fear, stress, excitement, of the user, anger/annoyance level of the user, etc.), detecting one or more concerns (disagreeable characteristics) of the user, and/or other user defined parameters, interests, factors, and/or concerns. For example, the cognitive hearing device service may simultaneously analyze both the source of the sound and the type/content involved with that sound segment to determine a relevance of the source or objected.

By analyzing the audible indicator and determining the identity of the audible data source (e.g., analysis of the wake-sound and speaker identity), the cognitive hearing aid device service may be trained, using a machine learning operation, to recognize one or more sounds, voices, or other audible tones associated with a user profile, cognitive/emotional or health state (e.g., one or more interests, preferences, confusion of the user, inquisitiveness, anger/annoyance level, and/or requirement or need for information to facilitate hearing of the user). In this way, the cognitive hearing aid device service may: 1) adjust and/or control a hearing aid device output (e.g., diverse tones, volume, pace of the speech or frequency, activate a light for display on the hearing aid device itself, engage or trigger the activation of one or more features or functionalities of an Internet of Things ("IoT") computing device, initiate and make a phone call to a selected recipient based on context.), and/or 2) personalize a hearing/language translation based on analyzed user current context and cognitive state.

In an additional aspect, the joint analysis of the audio data (e.g., sound and/or conversation) may determine a danger level of the audio data by analyzing and characterizing one or more physical properties of sounds/audio data, the nature, type and/or tone level of the sounds. Dangerous levels of sound may be predefined, learned, and/or include: a set of danger sounds (e.g., a scream, crying, police siren, baby crying, broken window/glass, knock on front door, fire alarm, carbon monoxide detector, or other sound associated with danger, excited, and/or concern), etc.

Also, the cognitive hearing aid device service may facilitate hearing by filtering undesired concerns (e.g., disagreeable characteristics) based on the user specified concerns. In one scenario, the cognitive hearing aid device service may learn a user's concerns (e.g., agreeable and/or disagreeable characteristics) by analyzing the user's cultural/social group/network, analyzing historical user engagements (e.g., social media posts, text messages, emails, etc.), by determining the user' personality type and/or measuring the historical tones of the user using one or more AI services such as, for example, using instance of IBM® Watson® such as Watson® Assistant, Watson® Personality Insight, and/or Watson® Tone Analyzer cloud service. (IBM® and Watson® are trademarks of International Business Machines Corporation.)

Furthermore, the cognitive hearing aid device may communicate with other devices such as, for example, one or more IoT computing devices (e.g., wireless communication phones, wearable monitoring devices) that may be used to connect to a telephone call and/or perform the filtering mechanism of volume, tone, and/or frequency adjustment. Also, the cognitive hearing device may cause a haptic effect in the IoT computing devices (e.g., wearable devices, electronic textile based cloths etc.) Based on the analysis of the audio data (e.g., discussion content analysis), a prediction engine may predict if a subsequent discussion may be of any interest, concern, or preference to the user and may provide a proactive alert to the user so that the user becomes attentive to the discussion.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
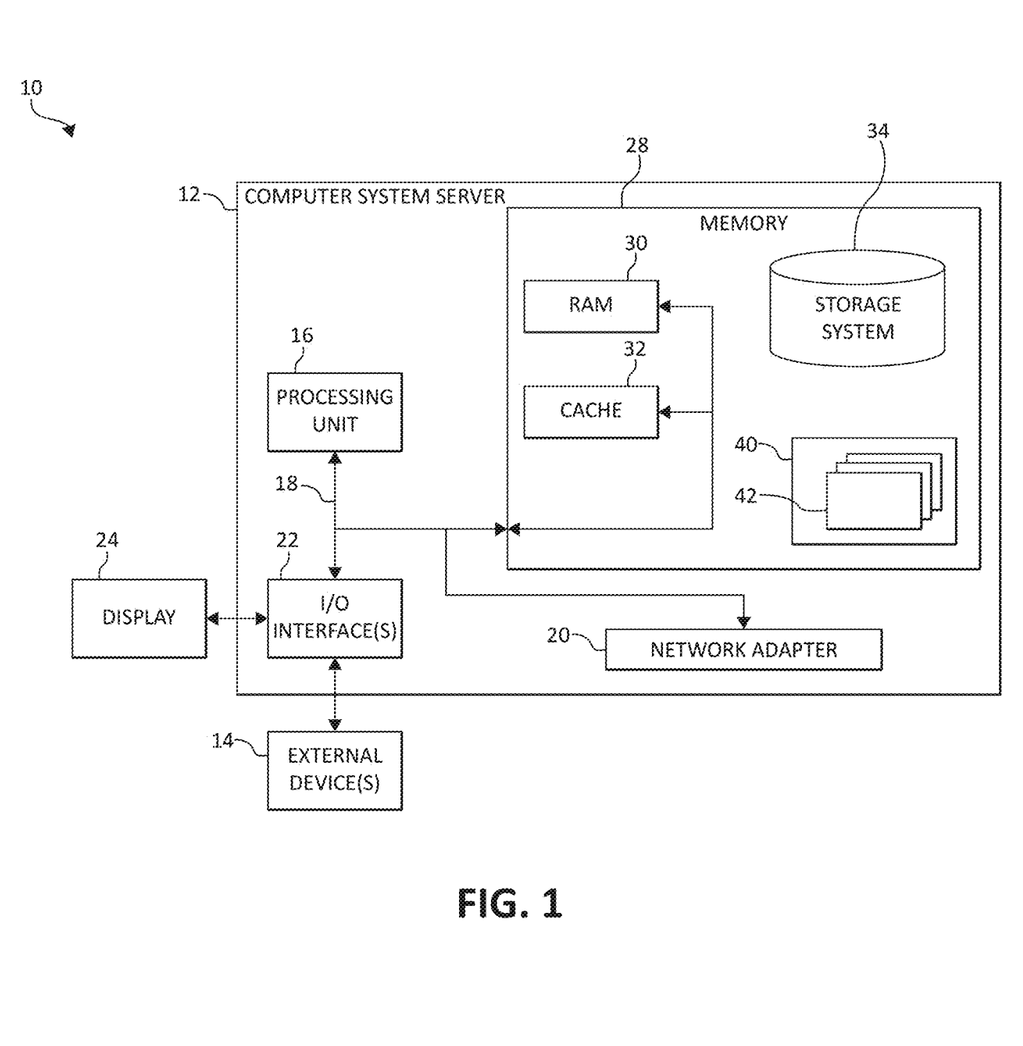
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
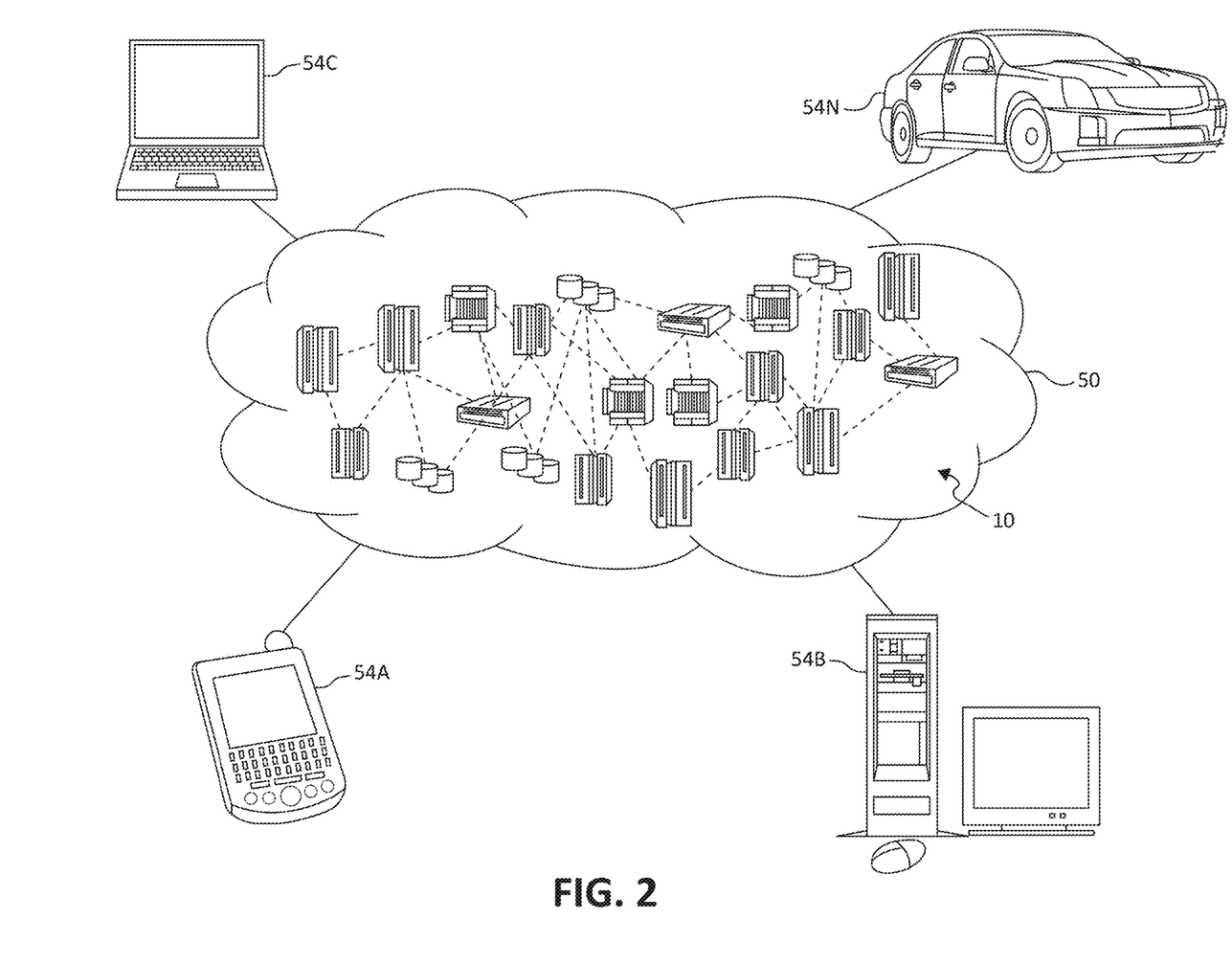
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or other type of computer systems 54N (e.g., an automobile computer system) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
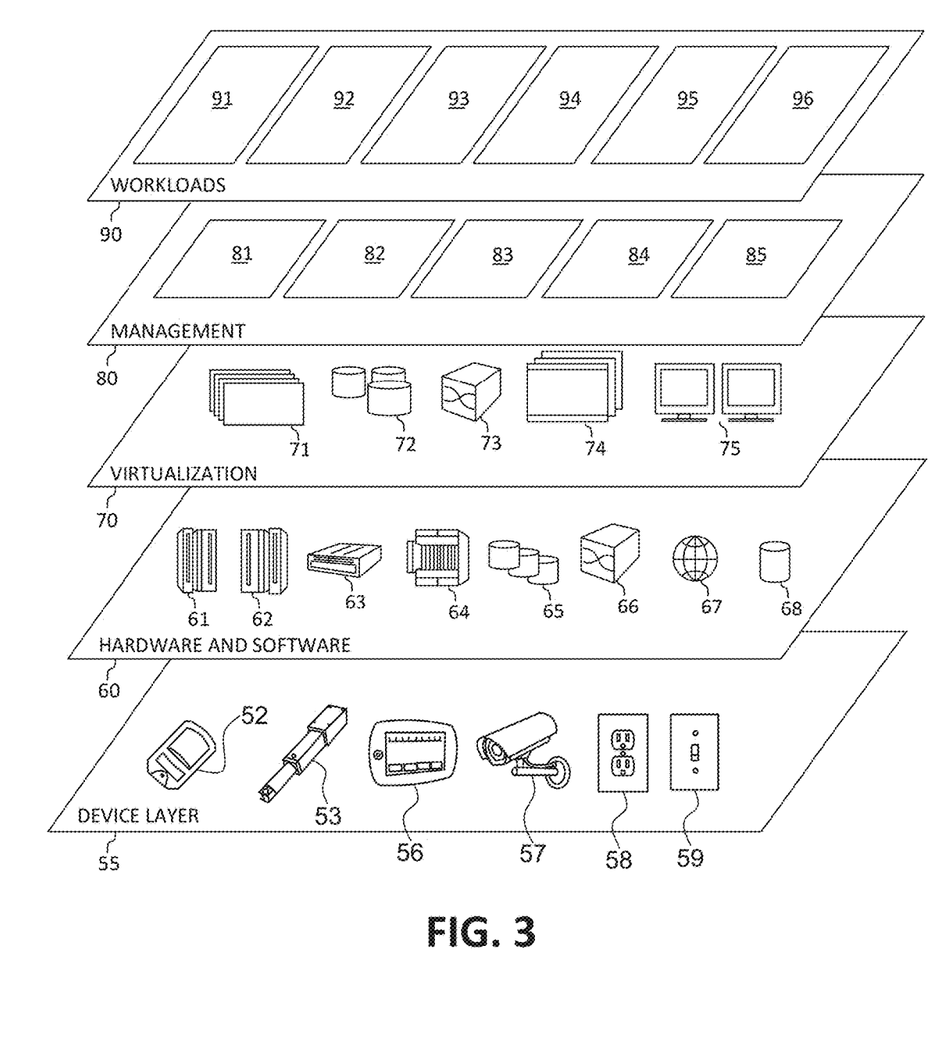
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for cognitive use of an intelligent hearing aid device. In addition, the workloads and functions 96 for cognitive use of an intelligent hearing aid device may include such operations as data analytics, data analysis, and as will be further described, notification functionality. One of ordinary skill in the art will appreciate that the workloads and functions 96 for cognitive use of an intelligent hearing aid device may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for cognitive use of an intelligent hearing aid device in a computing environment. In one aspect, audio data may be received and analyzed for a user according to a plurality of user preferences and interests, historical activity patterns of the user, or a combination thereof. One or more hearing assistive actions may be performed in relation to the audio data to facilitate hearing according to the plurality of user preferences and interests, historical activity patterns of the user, or a combination thereof.

Figure 4:
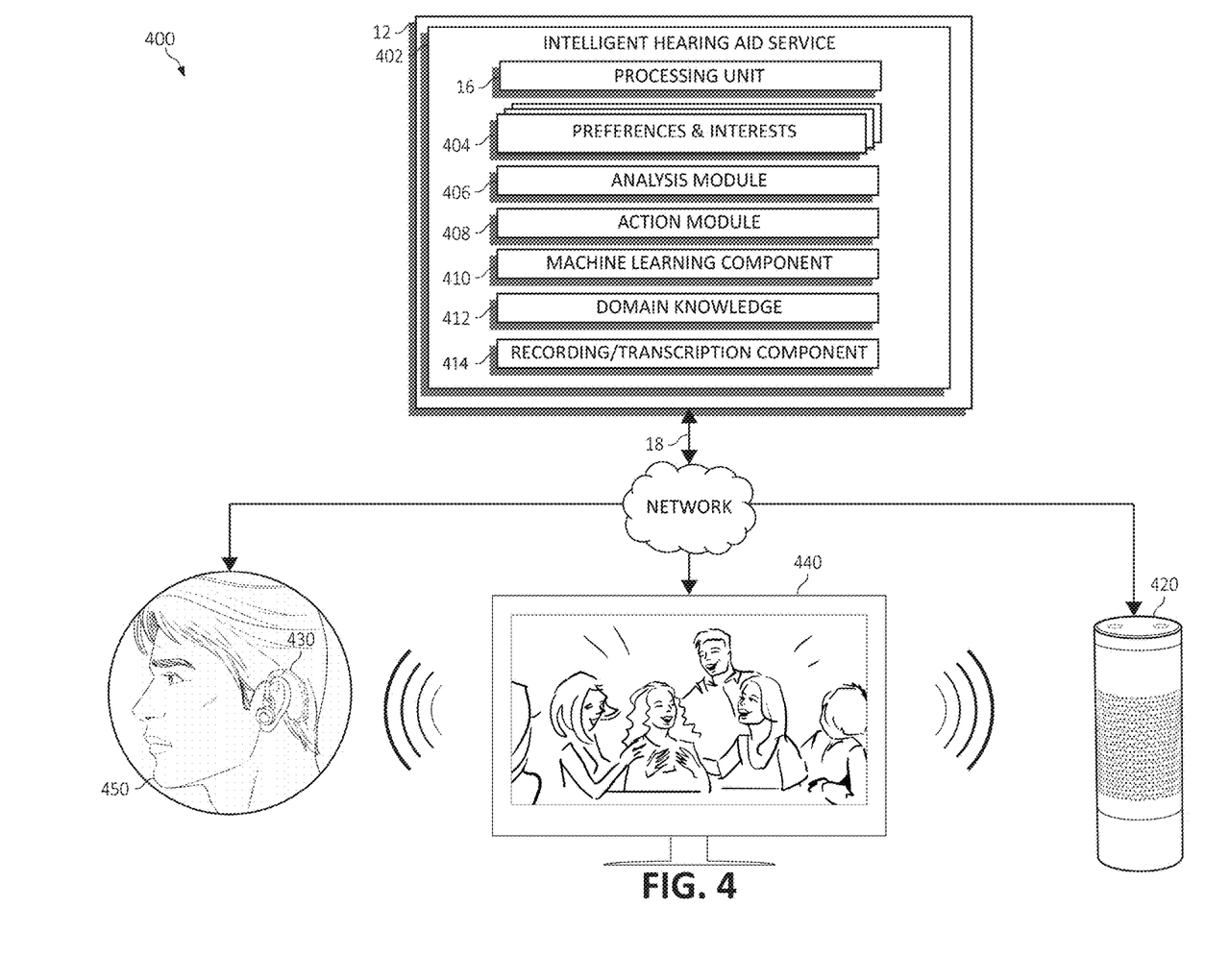
FIG. 4 is an additional block diagram depicting various interconnected computing components, input devices, and control devices functioning in accordance with aspects of the present invention.

Turning now to FIG. 4, a block diagram depicting exemplary functional components 400 according to various mechanisms of the illustrated embodiments is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4. Computer system/server 12 is again shown, which may incorporate an intelligent hearing aid service 402.

In one aspect, the computer system/server 12 may provide virtualized computing services (i.e., virtualized computing, virtualized storage, virtualized networking, etc.) to one or more computing devices, as described herein. More specifically, the computer system/server 12 may provide virtualized computing, virtualized storage, virtualized networking and other virtualized services that are executing on a hardware substrate.

The intelligent hearing aid service 402 may be in communication with and/or association with one or more computing devices such as, for example, a hearing aid device 430, a voice activated hub 420, and/or an internet of things ("IoT") computing device 440 (e.g., a camera, television, smart phone, desktop computer, laptop computer, tablet, smart watch and/or another electronic device that may have one or more processors, memory, and/or wireless communication technology). The intelligent hearing aid service 402, the intelligent hearing aid device 430, the voice activated hub 420, and the IoT computing device 440 may each be associated with and/or in communication with each other, by one or more communication methods, such as a computing network, wireless communication network, or other network means enabling communication (each collectively referred to in FIG. 4 as "network"). In one aspect, the intelligent hearing aid service 402 may be installed locally on the intelligent hearing aid device 430, the voice activated hub 420, and/or the IoT computing device 440. Alternatively, the intelligent hearing aid service 402 may be located external to (e.g., via a cloud computing server) each of the intelligent hearing aid device 430, the voice activated hub 420, and/or the IoT computing device 440.

The intelligent hearing aid service 402 may incorporate processing unit 16 to perform various computational, data processing and other functionality in accordance with various aspects of the present invention. A database of preferences and interests 404 (e.g., a knowledge domain or ontology) is shown, along with an analysis component 406, an action component 408, a machine learning component 410, and/or a recording/transcription component 414.

The database of preferences and interests 404 may include and/or be associated the domain knowledge 412, which may be an ontology of concepts, keywords, expressions representing a domain of knowledge. A thesaurus or ontology may be used as the database 475 and may also be used to identify semantic relationships between observed and/or unobserved variables by the machine learning component 410 (e.g., a cognitive component). In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge 412 may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

In one aspect, the one or more preferences and interests 404 may be received or collected from a user, mobile or stationary objects. The preferences and interests 404 may also be learned via a machine learning operation (via the machine learning component 410) in relation to received feedback from a user via the intelligent hearing aid device 430, the voice activated hub 420, and/or the IoT computing device 440. The preferences and interests may include, for example, a user profile (which may include preferences, interests, concerns, cognitive/emotional date, health state, ADL's, etc., of each user), historical activity patterns of the user in relation to the intelligent hearing aid service 402, the intelligent hearing aid device 430, the voice activated hub 420, and/or the IoT computing device 440. The preferences and interests may also be stored with a keyword dictionary or ontology (e.g., a lexical database ontology), which may be associated with the central server, the cloud computing network, the local area network server, and/or the computing system 12.

In an additional aspect, the analysis component 406 of the computer system/server 12 may work in concert with processing unit 16 to accomplish various aspects of the present invention. For example, analysis component 406 may undergo various data analytics functions to analyze audio data communicated from one or more devices such as, for example, the voice activated hub 420 and/or the IoT computing device 440.

The analysis component 406 may receive and analyze each physical property associated with audio data. The analysis component 406 may cognitively receive and/or detect audio data for the intelligent hearing aid device 430 according to a plurality of user preferences and interests, historical activity patterns of the user, or a combination thereof.

The analysis component 406, the action component 408, and/or the machine learning component 410 may access and monitor one or more audio data sources such as, for example, the voice activated hub 420 and/or the IoT computing device 440 (e.g., a radio, telephone, television, computer, etc.) to detect the audio data. For example, the IoT computing device 440 may be broadcasting a news network station reporting local weather data for the upcoming week. The analysis component 406, the action component 408, and/or the machine learning component 410, which may be monitoring and accessing the IoT computing device 440, may detect the broadcasted weather data.

As part of detecting the audio data, the analysis component 406, the action component 408, and/or the machine learning component 410 may identify, from the audio data, one or more sources of the audio data, contextual factors associated with the of the audio data, one or more characteristics of the audio data, one or more predefined concerns of the user, or a combination thereof. Also, the machine learning component 410 may initiate a machine learning operation to learn the plurality of user preferences and interests, historical activity patterns of the user, a cognitive state of the user, the contextual factors associated with the audio data, the one or more characteristics of the audio data, the one or more predefined concerns of the user, social media communications, feedback data collected from the user, or a combination thereof.

The action component 408 may also perform one or more actions (e.g., hearing assistive actions), in relation to the audio data, to facilitate hearing, via the intelligent hearing aid device 430, according to the plurality of user preferences and interests, historical activity patterns of the user, or a combination thereof. The analysis component 406 may cognitively analyze the audio data to determine the one or more actions. The one or more actions may include, but not limited to: adjusting a physical property of sound generated by the intelligent hearing aid, adjusting a frequency or speed of the audio data, causing the intelligent hearing aid to perform one or more functions, issuing an alarm, extracting one or more keywords or phrases using natural language processing ("NLP"), translating the audio data into forms of structured data, engaging in an interactive dialog with the user to collect feedback in relation to the audio data, initiating one or more communications with a third party entity, or a combination thereof.

The recording/transcription component 414 may also dynamically record and store the audio data. For example, the machine learning may learn and rank each type of audio data preferred and/or of interest to the user. Thus, the user may have a priority interest in listening to weather reports broadcasted from a preferred news channel, but any conference call with co-workers may be assigned as the highest priority (as compared to the weather broadcast). Returning the example above with the IoT computing device 440 broadcasting the weather report, assume now that the voice activated hub 420 is being used for a conference call with a group of friends, family, or business associates. The recording/transcription component 414 may then record the weather report broadcast (e.g., record, transcribe, and/or save an audio transcript), extract one or more keywords/phrases, and/or use NLP to transcribe the weather report to text form.

In an additional aspect, the machine learning component 410, in association with the analysis component 406, may estimate one or more concerns of the user 450 according to social media communications, a user profile, one or more measured tones used by the user, location data, or a combination thereof. Thus, the action component 408 may filter one or more portions of the audio data according to the one or more concerns (e.g., facial expressions) of the user 450 relating to the audio data. For example, assume the user 450 expresses, on a social media network, disinterest in a particular movie or television program. The machine learning component 410 may learn of the particular disinterests or concerns for the particular movie or television program. Assume, upon completion of the weather report being broadcast, via IoT computing device 440 (e.g., a television), the IoT computing device 440 begins to broadcast the movie the user 450 dislikes. Accordingly, the action component 408 may filter all or portions of the audio data (e.g., the movie) according to the concerns of the user relating to the audio data. The action component 408 may even send an alert to the intelligent hearing aid device 430 to alert the user the sound level of the intelligent hearing aid device 430 is being minimized or reduce to avoid hearing the movie. As an alternative action, the intelligent hearing aid device 430 may even issue a signal/notification to the IoT computing device 440 to change the channel to an alternative channel (e.g., change from the channel broadcasting the movie to a preferred or favorite channel such as, for example, an additional channel that may be broadcasting weather).

In an additional aspect, the intelligent hearing aid service 402, which may be locally installed on the intelligent hearing aid device 430 and/or accessed by the intelligent hearing aid device 430, may detect audio data (e.g., conversation occurring between one or more individuals, a conversation being broadcasted over an IoT computing device, etc.), which is of interest to the user based on monitoring the user's previous history pattern and common interests. Accordingly, the intelligent hearing aid service 402 may adjust a tone, volume, pace of the speech and/or frequency of the audio data based on the established pattern history for the user 450. Also, words, phrases, and/or compete sentences (e.g., all or portions of a conversation) by other parties relating to the audio data may be transcribed in a text form based on an NLP extraction operation (e.g., NLP based keyword extraction). The text data may be relayed, sent, stored, or further processed so that the same audio data (e.g., all or portions of the conversations) may be heard or listened to by the intelligent hearing aid device 430 at a later point of time. For example, the text data may be sent as an email to user 450 with a customized alert notification provided to the intelligent hearing aid device 430 informing the user 450 of the provided transcript and email.

In one aspect, the NLP based keyword extraction may be used for extracting and storing relevant topics of conversation such as, for example, stored in a cloud computing system (e.g., cloud database), which may be integrated with and/or associated with the intelligent hearing aid device 430 for fetching the information.

As previously indicated, the intelligent hearing aid service 402 may also communicate with other linked devices such as, for example, the voice-activated hub 420 and/or the IoT computing device 440 to further monitor any news, events, and/or activities to capture the information the user 450 follows and develop a rigidity factor to store and maintain in a user profile of the relevant topics of interest. That is, each topic, preference, interest, concern, or other areas of interest may be ranked according to a degree of interest or disinterest.

The analysis component 406 and/or the machine learning component 410 may also various computing devices (e.g., the voice-activated hub 420 and/or the IoT computing device 440) for detecting, learning, analyzing a conversation, and/or detecting a pattern for common interests. Moreover, the analysis component 406 and/or the machine learning component 410 may even access one or more online data sources such as, for example, a social media network, website, or data site for detecting, learning, analyzing a conversation, and/or detecting a pattern for preferences and interests of the user 450. That is, the analysis component 406 and/or the machine learning component 410 may learn and observe, for the user 450, a degree or level of attention, a type of response, and/or feedback as to various topics. The learned and observed behavior of the user may be linked to various data sources that provide personal information, social media data, or user profile information to learn and establish subjects or topics of interest to the user 450. The analysis component 406 and/or the machine learning component 410 may establish and/or determine a confidence factor relating to the preference or interest for the user according to a predefined threshold for so as to define one or more actions (e.g., an event) for the intelligent hearing aid service 402 to perform.

In one aspect, an action may include, but not limited to: locating and/or identifying one or more individuals (e.g., voice recognition) and location with regard to an entity's location, adjusting one or more hearing aid settings of the intelligent hearing aid device 430 (e.g., filtering] to increase the detection and capture of a targeted conversation (assuming the user 450 is not already active in a conversation with another party). Also, if the user is involved in a conversation with another party, the intelligent hearing aid service 402 may: A) prompt the user 450 that a target convention is happening between individuals in: i) a direction in reference to the user 450, or ii) if data is available by their names (e.g., from published social media or near field devices); and/or B) record information for later use and playback, which may include date, location and time of recording as well as their names (from published social media or near field devices).

The action component 408 may prompt the individual that there is a target conversation in a defined proximity to the user 450 and provide information to help and assist the user in locating the individuals involved in the target conversation in relation to the location of the user 450. Also, the action component 408 may identify each individual and provide names (from published social media or near field devices) of the individuals involved in the target conversation to the user via the intelligent hearing aid device 430. In this way, the user 450 may decide to move to closer to the target conversation and/or invoke a filtering and recording of the conversation.

Also, as indicated, the recording/transcription component 414 may transcribe and/or record multiple conversations simultaneous for later playback, which may include voice-to-text translation. The transcription and recording may also include identification information (e.g., a names) from each entity that speaks or communicates in the audio data. Also, one or more videos and/or photo reference may be provided on the transcription and/or recording, if the intelligent hearing aid device 430 and/or a near field enable camera feature is available on an IoT local device (e.g., voice-activated hub 420 and/or IoT computing device 440) capable of capturing and one or more conversational target parties. The machine learning component 410 may learn the interests with respect to one or more tagged conversation topics and enable the intelligent hearing aid device 430 to dynamically activate from a low power mode to a high power mode such as, for example, once the topics of interest are being discussed or talked about in the audio data in a proximal region of the user 450 along with the person who is talking about the same.

The machine learning component 410 may also learn geo-location based interests. For example, a tone dilation and frequency adjustment may be performed by the action component 408 (in association with the machine learning component 410) with respect to the field of geo-spatial region set by the user 450. The user 450 may link to a near field device (e.g., IoT computing device 440 and/or voice activated hub 430) located in another location (e.g., another room, building, region). A microphone of the intelligent hearing aid device 430 and/or the near field device (e.g., IoT computing device 440 and/or voice activated hub 430) may be used to monitor, detect, and collect audio data relating to the audio data. For example, if one or more persons are located in another room/office and talking/discussing relevant topics of interest related to the user 450 of the intelligent hearing aid device 430, a tone and pitch of the sound of the audio data can be amplified by the action component 408 of the more co-workers accordingly based on user's historic preferences. Similarly, if the persons are again in a different room, but are talking about topics or subject, which are not relevant to user 450, the intelligent hearing aid device 430, using the action component 408, may cognitively decide a course of action that may filter, eliminate, record, transcribe, and/or nullify the voice, thereby staying in an ultra-low power mode.

If desired, one or more geo-tagged filter rules (e.g., at a service point/location) may be implemented and configured for one or more computing devices (e.g., the IoT computing device 440 and/or the voice activated hub 420) and/or communication devices (e.g., Beacon, Wi-Fi hotspot, cellular tower, etc.). That is, a user may set one or more preference based on a location. For example, a user, when not at home, may pay less attention to certain topics that might be of interest to the user when at the user's home but ignore the same topics in certain environments. For example, a user may feel comfortable and interested in political discussions within the user's home, but not interested to hear the general public's debate of such issues when being at a public function such as, for example, a theater lobby. Accordingly, the location of the user may be detected, and the appropriate preferences and/or interests applied to the detected location.

In an additional embodiment, the recording/transcription component 414 may translate the audio data such as, for example, translating audio data having one or more concerns for the user 450 into filtering rules. For each translated rule "R", the recording/transcription component 414 may further compute a degree of positivity and/or negativity having a potential positive or negative impact upon the cognitive state and/or health state of the user (e.g., happy, sad, excited, anxious) and assigns weight to the rule "R". The filtering rules may be optimally represented as multidimensional array, wherein each dimension of the array may represent one aspect of the user concern.

It should be noted that the intelligent hearing aid service 402 may facilitate the use of one or more filtering rules (e.g., filtering sound according to location or topic and filtering without revealing sensitive and/or personally identifiable information of a user) of a group of users, if the users are determined to be similar and/or close in disagreeable concerns, personality type, tone similarity.

In other embodiments, the mechanisms of the present invention may control various settings and configurations of the intelligent hearing aid device 430 itself in response to the audio data such to cause changes. In this way, the mechanisms of the illustrated embodiments may.

Figure 5:
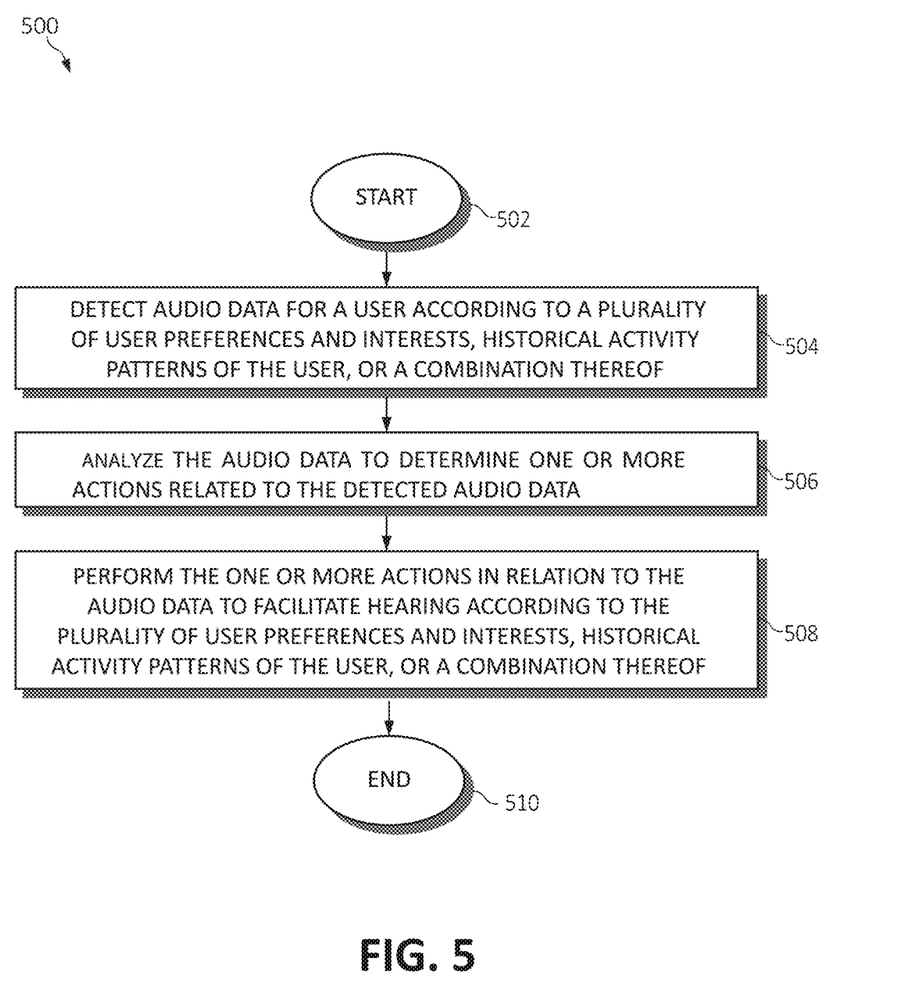
FIG. 5 is a flow chart diagram of an exemplary method for use of an intelligent hearing aid device by a processor, in which various aspects of the present invention may be implemented.

Turning now to FIG. 5, a method 500 for use of an intelligent hearing aid device by a processor is depicted. The functionality 500 may be implemented as a method executed as instructions on a machine, where the instructions are included on at least one computer readable medium or one non-transitory machine-readable storage medium. The functionality 500 may start in block 502.

Audio data may be detected for a user according to a plurality of user preferences and interests, historical activity patterns of the user, or a combination thereof, as in block 504. One or more actions (e.g., hearing assistive actions) may be performed in relation to the audio data to facilitate hearing according to the plurality of user preferences and interests, historical activity patterns of the user, or a combination thereof, as in block 506. The one or more actions may be performed in relation to the audio data to facilitate hearing according to the plurality of user preferences and interests, the historical activity patterns of the user, or a combination thereof, as in block 508. The functionality 500 may end in block 508.

Figure 6:
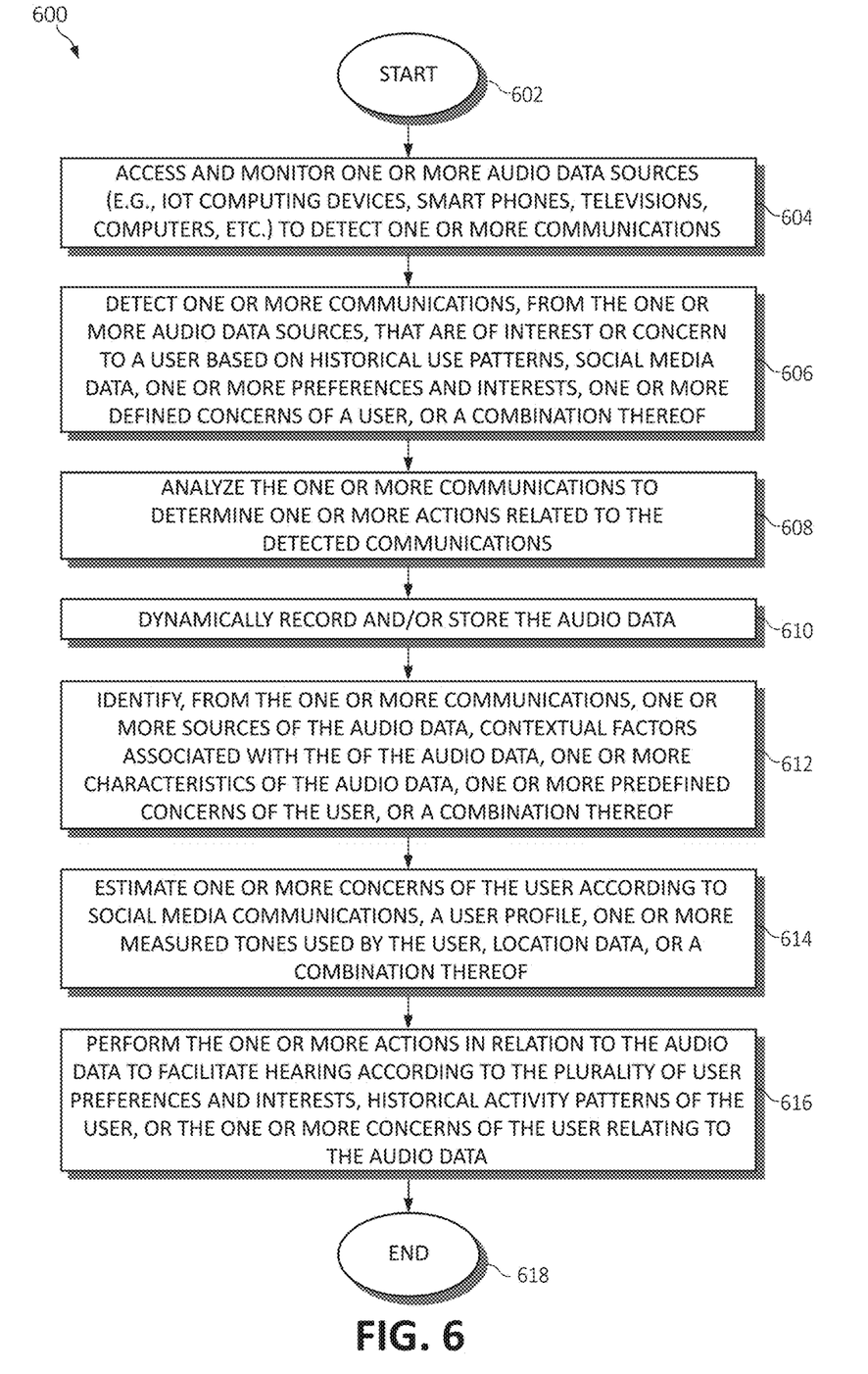
FIG. 6 is an additional flow chart diagram of an additional exemplary method for use of an intelligent hearing aid device by a processor, here again in which various aspects of the present invention may be implemented.

Turning now to FIG. 6, a method 600 for use of an intelligent hearing aid device by a processor is depicted. The functionality 600 may be implemented as a method executed as instructions on a machine, where the instructions are included on at least one computer readable medium or one non-transitory machine-readable storage medium. The functionality 600 may start in block 602.

One or more audio data sources (e.g., IoT computing devices, smart phones, televisions, computers, etc.) may be accessed and/or monitored to detect one or more communications, as in block 604. One or more communications may be detected, from the one or more audio data sources, that are of interest or concern to a user based on historical use patterns, social media data, one or more preferences and interests, one or more defined concerns of a user, or a combination thereof, as in block 606. The one or more communications may be analyzed to determine one or more actions related to the detected communications, as in block

608. The audio data may be dynamically recorded and/or stored, as in block 610. One or more sources of the audio data, contextual factors associated with the of the audio data, one or more characteristics of the audio data, one or more predefined concerns of the user, or a combination thereof may be identified from the one or more communications, as in block 612.

One or more concerns of the user may be estimated (and/or predicted) according to social media communications, a user profile, one or more measured tones used by the user, location data, or a combination thereof, as in block 614. One or more actions may be performed in relation to the audio data to facilitate hearing (e.g., increase or decrease a sound, tone, frequency, etc.) according to the plurality of user preferences and interests, historical activity patterns of the user, or the one or more concerns of the user relating to the audio data, as in block 616. The functionality 600 may end in block 618.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for use of an intelligent hearing aid device by a processor, comprising:
receiving and analyzing audio data for a user according to a plurality of user preferences and interests, historical activity patterns of the user, or a combination thereof, wherein analyzing the audio data includes estimating one or more predefined concerns of the user according to information received from social media communications and detected conversations, sounds, or tones determined to be of interest to the user;
identifying one or more hearing assistive actions in relation to the audio data; and
facilitating hearing of the user, using the one or more hearing assistive actions, according to the plurality of user preferences and interests, historical activity patterns of the user, or a combination thereof, wherein the facilitating includes filtering one or more portions of the audio data according to the one or more predefined concerns of the user relating to the audio data.

2. The method of claim 1, further including:
defining the one or more hearing assistive actions as adjusting a physical property of sound generated by the intelligent hearing aid, adjusting a frequency or speed of the audio data, causing the intelligent hearing aid to perform one or more functions, issuing an alarm, extracting one or more keywords or phrases using natural language processing ("NLP"), translating the audio data into forms of structured data, engaging in an interactive dialog with the user to collect feedback in relation to the audio data, initiating one or more communications with a third party entity, or a combination thereof; or
analyzing the audio data to determine the one or more hearing assistive actions.

3. The method of claim 1, further including accessing and monitoring one or more audio data sources to detect the audio data.

4. The method of claim 1, further including dynamically recording and storing the audio data.

5. The method of claim 1, further including identifying, from the audio data, one or more sources of the audio data, contextual factors associated with the of the audio data, one or more characteristics of the audio data, the one or more predefined concerns of the user, or a combination thereof.

6. The method of claim 1, further including initiating a machine learning operation to learn the plurality of user preferences and interests, historical activity patterns of the user, a state of the user, the contextual factors associated with the audio data, the one or more characteristics of the audio data, the one or more predefined concerns of the user, the social media communications, feedback data collected from the user, or a combination thereof.

7. A system for use of an intelligent hearing aid device, comprising:
one or more computing components associated with the intelligent hearing aid with executable instructions that when executed cause the system to:
receive and analyze audio data for a user according to a plurality of user preferences and interests, historical activity patterns of the user, or a combination thereof, wherein analyzing the audio data includes estimating one or more predefined concerns of the user according to information received from social media communications and detected conversations, sounds, or tones determined to be of interest to the user;
identify one or more hearing assistive actions in relation to the audio data; and
facilitate hearing of the user, using the one or more hearing assistive actions, according to the plurality of user preferences and interests, historical activity patterns of the user, or a combination thereof, wherein the facilitating includes filtering one or more portions of the audio data according to the one or more predefined concerns of the user relating to the audio data.

8. The system of claim 7, wherein the executable instructions further:
define the one or more hearing assistive actions as adjusting a physical property of sound generated by the intelligent hearing aid, adjusting a frequency or speed of the audio data, causing the intelligent hearing aid to perform one or more functions, issuing an alarm, extracting one or more keywords or phrases using natural language processing ("NLP"), translating the audio data into forms of structured data, engaging in an interactive dialog with the user to collect feedback in relation to the audio data, initiating one or more communications with a third party entity, or a combination thereof; or
analyzing the audio data to determine the one or more hearing assistive actions.

9. The system of claim 7, wherein the executable instructions further access and monitor one or more audio data sources to detect the audio data.

10. The system of claim 7, wherein the executable instructions further dynamically record and store the audio data.

11. The system of claim 7, wherein the executable instructions further identify, from the audio data, one or more sources of the audio data, contextual factors associated with the of the audio data, one or more characteristics of the audio data, the one or more predefined concerns of the user, or a combination thereof.

12. The system of claim 7, wherein the executable instructions further initiate a machine learning operation to learn the plurality of user preferences and interests, historical activity patterns of the user, a state of the user, the contextual factors associated with the audio data, the one or more characteristics of the audio data, the one or more predefined concerns of the user, the social media communications, feedback data collected from the user, or a combination thereof.

13. A computer program product for use of an intelligent hearing aid device by one or more processors, the computer program product comprising a non-transitory computer-readable storage medium having computer-readable program code portions stored therein, the computer-readable program code portions comprising:
an executable portion that receives and analyzes audio data for a user according to a plurality of user preferences and interests, historical activity patterns of the user, or a combination thereof, wherein analyzing the audio data includes estimating one or more predefined concerns of the user according to information received from social media communications and detected conversations, sounds, or tones determined to be of interest to the user;

an executable portion that identifies one or more hearing assistive actions in relation to the audio data; and an executable portion that facilitates hearing of the user, using the one or more hearing assistive actions, according to the plurality of user preferences and interests, historical activity patterns of the user, or a combination thereof, wherein the facilitating includes filtering one or more portions of the audio data according to the one or more predefined concerns of the user relating to the audio data.

14. The computer program product of claim 13, further including an executable portion that:

defines the one or more hearing assistive actions as adjusting a physical property of sound generated by the intelligent hearing aid, adjusting a frequency or speed of the audio data, causing the intelligent hearing aid to perform one or more functions, issuing an alarm, extracting one or more keywords or phrases using natural language processing ("NLP"), translating the audio data into forms of structured data, engaging in an interactive dialog with the user to collect feedback in relation to the audio data, initiating one or more communications with a third party entity, or a combination thereof; or analyzes the audio data to determine the one or more hearing assistive actions.

15. The computer program product of claim 13, further including an executable portion that:

accesses and monitors one or more audio data sources to detect the audio data; and dynamically records and stores the audio data.

16. The computer program product of claim 13, further including an executable portion that identifies from the audio data one or more sources of the audio data, contextual factors associated with the of the audio data, one or more characteristics of the audio data, the one or more predefined concerns of the user, or a combination thereof.

17. The computer program product of claim 13, further including an executable portion that initiates a machine learning operation to learn the plurality of user preferences and interests, historical activity patterns of the user, a state of the user, the contextual factors associated with the audio data, the one or more characteristics of the audio data, the one or more predefined concerns of the user, the social media communications, feedback data collected from the user, or a combination thereof.

* * * * *